United States Patent
Harrigan (10) Patent No.: US 9,002,343 B2
(45) Date of Patent: Apr. 7, 2015

(54) DISABLING A MOBILE PHONE SUSPECTED OF BEING A TRIGGER FOR A BOMB

(75) Inventor: David P. Harrigan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 11/836,918

(22) Filed: Aug. 10, 2007

(65) Prior Publication Data

US 2011/0003586 A1 Jan. 6, 2011

(51) Int. Cl.
*H04W 48/02* (2009.01)
*H04W 4/22* (2009.01)
*H04W 4/00* (2009.01)
*H04W 4/02* (2009.01)

(52) U.S. Cl.
CPC ............... *H04W 4/22* (2013.01); *H04W 4/001* (2013.01); *H04W 4/028* (2013.01)

(58) Field of Classification Search
USPC .............. 455/403–405, 410–411, 418–422.1; 379/202; 370/264
See application file for complete search history.

(56) References Cited

U.S. PATENT DOCUMENTS

| | | | |
|---|---|---|---|
| 3,996,393 A * | 12/1976 | Cortellino et al. | 430/296 |
| 5,812,535 A * | 9/1998 | Hallock et al. | 370/264 |
| 5,991,617 A * | 11/1999 | Powell | 455/410 |
| 6,556,819 B2 | 4/2003 | Irvin | |
| 6,563,426 B2 | 5/2003 | Herzberg | |
| 6,687,497 B1 | 2/2004 | Parvulescu et al. | |
| 6,701,231 B1 * | 3/2004 | Borugian | 701/30 |
| RE38,596 E * | 9/2004 | Hallock et al. | 370/264 |
| 7,130,624 B1 | 10/2006 | Jackson et al. | |
| 7,162,285 B2 | 1/2007 | Owens et al. | |
| 2003/0008644 A1* | 1/2003 | Akhterzzaman et al. | 455/418 |
| 2006/0148465 A1 | 7/2006 | Perdomo et al. | |
| 2007/0021097 A1 | 1/2007 | Gaeta et al. | |
| 2010/0068988 A1* | 3/2010 | Valentine et al. | 455/1 |

* cited by examiner

Primary Examiner — Kashif Siddiqui
(74) Attorney, Agent, or Firm — Edward J. Lenart; Mark McBurney; Biggers Kennedy Lenart Spraggins LLP (57) ABSTRACT

Methods, systems, and computer program products for disabling a mobile phone suspected of being a trigger for a bomb are provided. Embodiments include tracking, by one or more data communications servers of the data communications network, location, motion, and usage of a mobile phone; determining, by the one or more data communications servers, whether the location, the motion, and the usage of the mobile phone matches a suspect pattern of location, motion, and usage; and disabling, by the one or more data communications servers, the mobile phone only from receiving messages if the location, the motion, and the usage of the mobile phone matches a suspect pattern of location, motion, and usage.

18 Claims, 4 Drawing Sheets

| Suspect Pattern Database 320 | | | | |
|---|---|---|---|---|
| PatternID 360 | Location 350 | Motion 352 | Usage 354 | Disable 362 |
| 1 | SomeSpecific WarZone | No 1 hour | No 2 hours | Yes |
| 2 | SomeSpecific Bulding | No | No Call 1 hour | Yes |
| 3 | SomeDangerousRoadInWarCity | Yes | None | Yes |
| 4 | SomeDangerousRoadInWarCity | Yes | Yes | Yes |
| 5 | SomeDangerousRoadInWarCity | No | Yes | Yes |
| 6 | SomeDangerousRoadInWarCity | No | No | Yes |

FIG. 4

DISABLING A MOBILE PHONE SUSPECTED OF BEING A TRIGGER FOR A BOMB

BACKGROUND OF THE INVENTION

1. Field of the Invention

The field of the invention is data processing, or, more specifically, methods, apparatus, and products for disabling a mobile phone suspected of being a trigger for a bomb.

2. Description of Related Art

In many parts of the world, mobile phones are being employed as triggers for bombs such as car bombs, I.E.D.s (improvised explosive devices), and arson based bombs. These phones are typically disposable and difficult to trace after their use as a trigger for a bomb. Current methods of reducing the impact of bombs generally include detecting the explosive or incendiary components of the bomb ahead of time or increasing the amount of armor protecting sensitive assets in the case of a bomb attack. Such methods are not able to disable the bomb unless the bomb is detected first. There is therefore an ongoing need in reducing the risk posed by mobile phones are being employed as triggers for bombs.

SUMMARY OF THE INVENTION

Methods, systems, and computer program products for disabling a mobile phone suspected of being a trigger for a bomb are provided. Embodiments include tracking, by one or more data communications servers of the data communications network, location, motion, and usage of a mobile phone; determining, by the one or more data communications servers, whether the location, the motion, and the usage of the mobile phone matches a suspect pattern of location, motion, and usage; and disabling, by the one or more data communications servers, the mobile phone only from receiving messages if the location, the motion, and the usage of the mobile phone matches a suspect pattern of location, motion, and usage.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
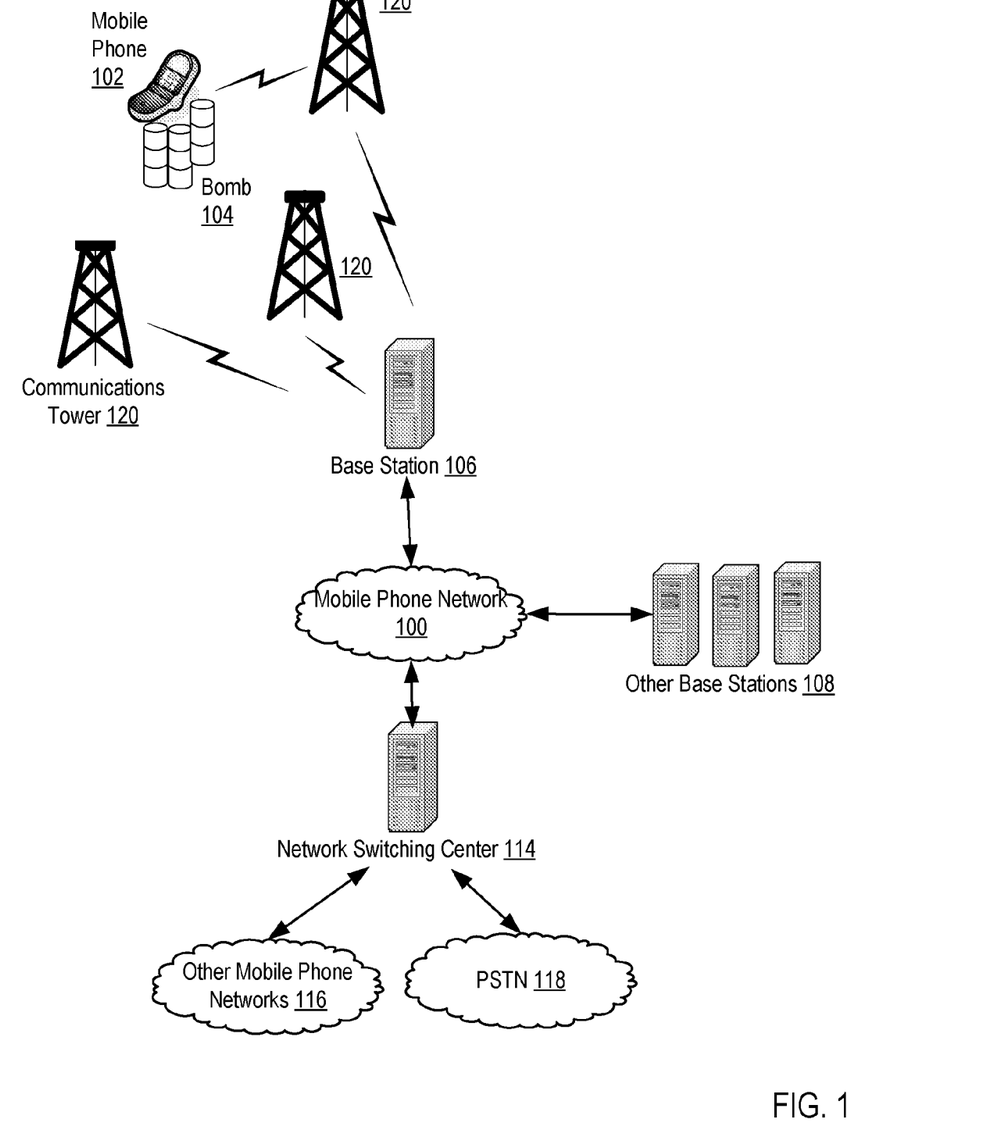
FIG. 1 sets forth a network diagram of a system for disabling a mobile phone suspected of being a trigger for a bomb according to embodiments of the present invention.

Exemplary methods, apparatus, and products for disabling a mobile phone suspected of being a trigger for a bomb in accordance with the present invention are described with reference to the accompanying drawings, beginning with FIG. 1. FIG. 1 sets forth a network diagram of a system for disabling a mobile phone suspected of being a trigger for a bomb according to embodiments of the present invention. The system of FIG. 1 includes a mobile phone (102) connected for data communications to a mobile phone network (100). The mobile phone (102) and mobile phone network (100) may comply with a number of mobile phone communications standards as will occur to those of skill in the art. Examples of such mobile phone communications standards include Global System for Mobile (GSM), Code Division Multiple Access, (CMDA), NTT DoCoMo, Time Division Multiple Access (TDMA) and others.

The mobile phone (102) of FIG. 1 is connected for data communications to the data communications network (100) through a number of communications towers (120) and a base station (108). The base station of FIG. 1 includes transmit and receive equipment for one or more cells of the mobile phone network. The base station also provides the interface between the network provider operating the mobile phone network and the mobile phone (102) itself.

The base station of FIG. 1 also includes one or more data communications servers capable of disabling a mobile phone suspected of being a trigger for a bomb. The data communications servers of the base station are capable of tracking location, motion, and usage of a mobile phone; determining whether the location, the motion, and the usage of the mobile phone matches a suspect pattern of location, motion, and usage; and disabling the mobile phone only from receiving messages if the location, the motion, and the usage of the mobile phone matches a suspect pattern of location, motion, and usage. Disabling the mobile phone only from receiving messages renders the mobile phone inoperative as a remote trigger for a bomb because the mobile phone may not receive any messages that would be used to detonate the bomb.

A suspect pattern of location, motion, and usage is a collection of locations, types of motion, and types of mobile phone usage that have been predefined as consistent with known or predicted examples of mobile phones used as triggers for bombs. Such suspect patterns may be created in response to precedent set by other bombs triggered by mobile phones or by predicting scenarios in which cell phones may be used as triggers for bombs.

The base station (108) of FIG. 1 and other base stations (108) are connected through the mobile phone network (100) to a network switching center (114). The network switching center (114) carries out many of the functions of the network such as path search, signal path switching, and processing of mobile phone services such as phone messaging, text messaging, an others.

The network switching center (114) of FIG. 1 also provides users of the mobile phone network (100) access to other mobile phone networks (116) and other networks such as the public switched telephone network (PSTN) (118) of FIG. 1. The PSTN (108) is a network of the world's public circuit-switched telephone networks. The PSTN was originally a network of fixed-line analog telephone systems, but is now almost entirely digital. PSTN is sometimes referred to as the Plain Old Telephone Service (POTS).

The network switching center (114) of FIG. 1 also includes one or more data communications servers capable of disabling a mobile phone suspected of being a trigger for a bomb. The data communications servers of the network switching center (114) are capable of tracking location, motion, and usage of a mobile phone; determining whether the location, the motion, and the usage of the mobile phone matches a suspect pattern of location, motion, and usage; and disabling the mobile phone only from receiving messages if the location, the motion, and the usage of the mobile phone matches a suspect pattern of location, motion, and usage.

Disabling a mobile phone suspected of being a trigger for a bomb according to the present invention have been described in the example of FIG. 1 as being carried out by data communications servers of either the base station (106) or the network switching center (114). This is for explanation, and not for limitation. In fact, disabling a mobile phone suspected of being a trigger for a bomb according to the present invention may be carried out by use of any combination of servers residing on base stations and network switching centers, as well as other data communications servers. Alternatively, disabling a mobile phone suspected of being a trigger for a bomb according to the present invention may be carried out using data communications servers that reside neither in a base station nor a network switching center as will occur to those of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Disabling a mobile phone suspected of being a trigger for a bomb in accordance with the present invention is generally implemented with computers, that is, with automated computing machinery. In the system of FIG. 1, for example, the base station, network switching center, and mobile phone networks are implemented to some extent with computers. For further explanation, therefore, FIG. 2 sets forth a block diagram of automated computing machinery comprising an exemplary data communications server (152) useful in disabling a mobile phone suspected of being a trigger for a bomb according to embodiments of the present invention. The data communications server (152) of FIG. 2 includes at least one computer processor (156) or 'CPU' as well as random access memory (168) ('RAM') which is connected through a high speed memory bus (166) and bus adapter (158) to processor (156) and to other components of the data communications server (152).

Figure 2:
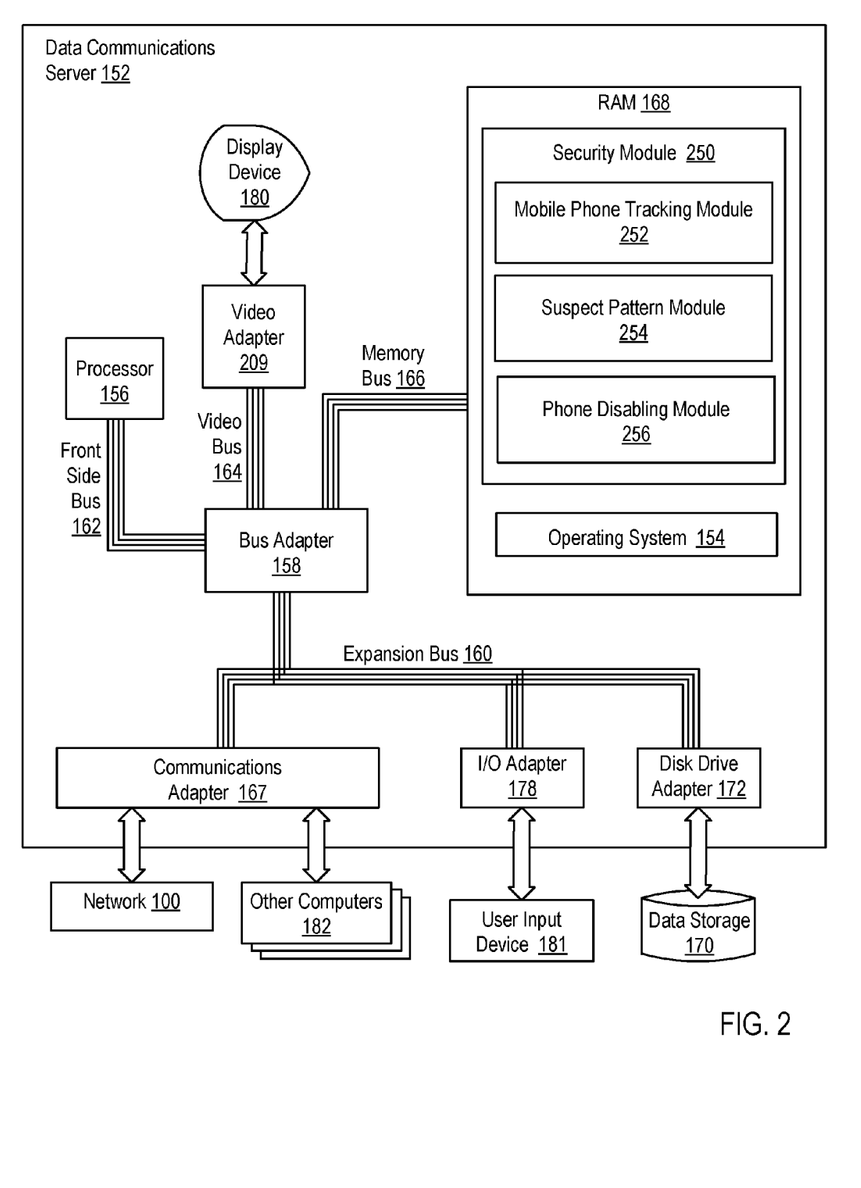
FIG. 2 sets forth a block diagram of automated computing machinery comprising an exemplary data communications server useful in disabling a mobile phone suspected of being a trigger for a bomb according to embodiments of the present invention.

Stored in RAM (168) is a security module (250), computer program instructions capable of disabling a mobile phone suspected of being a trigger for a bomb according to embodiments of the present invention. The security module (250) includes a mobile phone tracking module (252), computer program instructions capable of tracking location, motion, and usage of a mobile phone. The security module (250) also includes a suspect pattern module (254), computer program instructions capable of determining whether the location, the motion, and the usage of the mobile phone matches a suspect pattern of location, motion, and usage. The security module (250) also includes a phone disabling module (256), computer program instructions capable of disabling the mobile phone only from receiving messages if the location, the motion, and the usage of the mobile phone matches a suspect pattern of location, motion, and usage.

Also stored in RAM (168) is an operating system (154). Operating systems useful for disabling a mobile phone suspected of being a trigger for a bomb according to embodiments of the present invention include UNIX™, Linux™, Microsoft XP™, AIX™, IBM's i5/OS™, and others as will occur to those of skill in the art. The operating system (154) and security module (250), mobile phone tracking module (252), suspect pattern module (254), and mobile phone disabling module (256) in the example of FIG. 2 are shown in RAM (168), but many components of such software typically are stored in non-volatile memory also, such as, for example, on a disk drive (170).

The data communications server (152) of FIG. 2 includes disk drive adapter (172) coupled through expansion bus (160) and bus adapter (158) to processor (156) and other components of the data communications server (152). Disk drive adapter (172) connects non-volatile data storage to the data communications server (152) in the form of disk drive (170). Disk drive adapters useful for disabling a mobile phone suspected of being a trigger for a bomb according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data communications server (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data communications server (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data communications server (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for disabling a mobile phone suspected of being a trigger for a bomb according to embodiments of the present invention include modems for wired dial-up communications, Ethernet (IEEE 802.3) adapters for wired data communications network communications, and 802.11 adapters for wireless data communications network communications.

Figure 3:
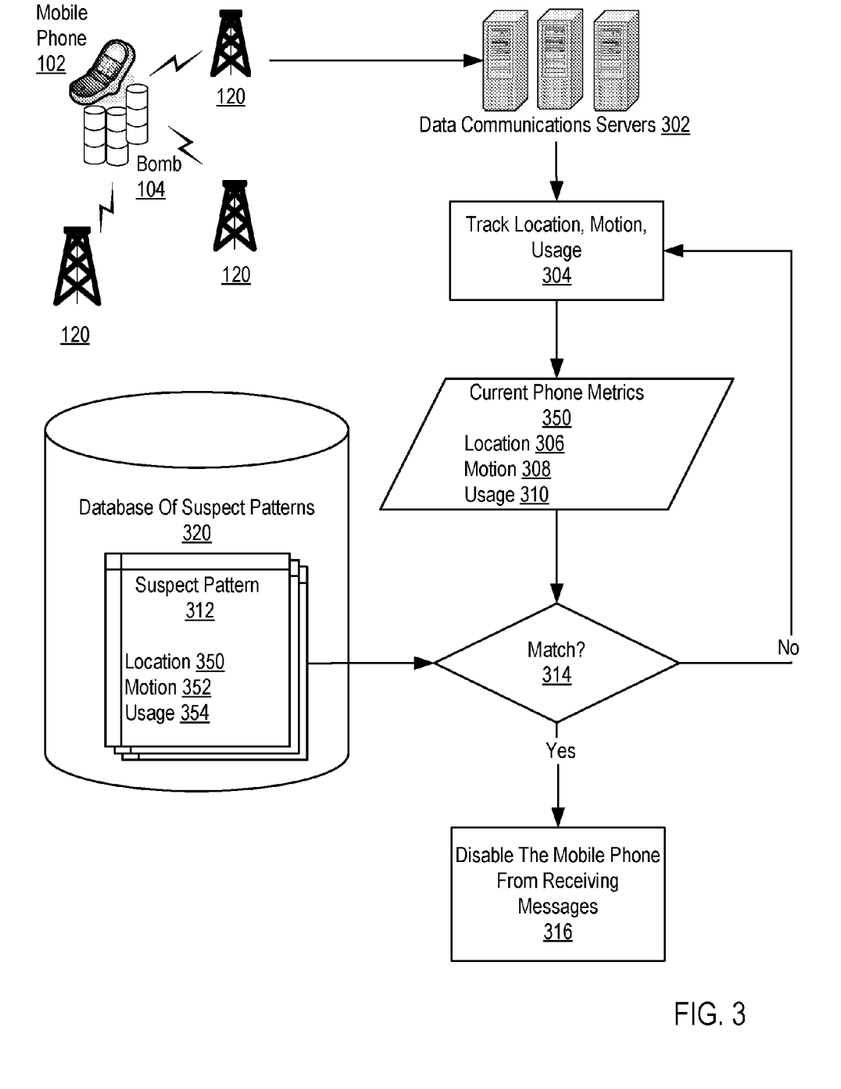
FIG. 3 sets forth a flow chart illustrating an exemplary method for disabling a mobile phone suspected of being a trigger for a bomb according to embodiments of the present invention.

For further explanation, FIG. 3 sets forth a flow chart illustrating an exemplary method for disabling a mobile phone suspected of being a trigger for a bomb according to embodiments of the present invention. In the method of FIG. 3 the mobile phone is connected for data communications to a mobile phone network including a plurality of data communications servers (302). The mobile phone and data communications servers implementing a data communications network may comply with a number of mobile phone communications standards as will occur to those of skill in the art. Examples of such mobile phone communications standards include Global System for Mobile (GSM), Code Division Multiple Access, (CMDA), NTT DoCoMo, Time Division Multiple Access (TDMA) and others.

The method of FIG. 3 includes tracking (304), by one or more data communications servers (302) of the data communications network, location (306), motion (308), and usage (310) of a mobile phone (102). Tracking (304) location (306) may be carried out by use of Global Positioning System receiver located within the mobile phone (102). A GPS receiver located in the mobile phone of FIG. 3 is capable of calculating its position by measuring the distance between the mobile phone (102) and three or more GPS satellites. Measuring the time delay between transmission and reception of a GPS microwave signal to each GPS satellite gives the distance to each satellite because the signal travels at a known speed. The signals also carry information about each GPS satellite's location. By determining the position of, and distance to, at least three satellites, the receiver can compute its position using trilateration and provide that location to data communications servers of the mobile phone data communications network.

Trilateration is a method of determining the relative positions of objects using the geometry of triangles in a similar fashion as triangulation. Unlike triangulation, which uses angle measurements (together with at least one known distance) to calculate the GPS receiver's location, trilateration uses the known locations of two or more GPS satellites, and the measured distance between the subject and each reference point.

Some mobile phones do not have GPS receivers embedded within them. Tracking (304) location (306) therefore alternatively may be carried out by use of triangulation. Triangulation is a process by which the location of a the mobile phone transmitter can be determined by measuring either the radial distance, or the direction, of the received signal from two or three different local mobile phone towers (120).

Tracking (304) motion (308) may be carried out by repeatedly tracking the location of the mobile phone and comparing the tracked locations. If the tracked locations the same, the mobile phone may be considered stationary, or not moving. If the tracked locations are different, the mobile phone may be considered moving, that is, often the mobile phone is moving because it is with a moving user. Tracking motion may also include determining a direction and rate at which the mobile phone, and often its accompanying a user, is moving.

Tracking (304) usage (310) of a mobile phone (102) may be carried out by tracking activities performed by the mobile phone such as tracking incoming phone calls, outgoing phone calls, additions or deletions of calendar entries for calendaring functions of the mobile phone, incoming or outgoing text messages or any other usage of the mobile phone as will occur to those of skill in the art.

The method of FIG. 3 also includes determining (314), by the one or more data communications servers (302), whether the location (306), motion (308), and usage (310) of the mobile phone (102) matches a suspect pattern (312) of location (350), motion (352), and usage (354). Determining (314) whether the location (306), motion (308), and usage (310) of the mobile phone (102) matches a suspect pattern (312) of location (350), motion (352), and usage (354) may be carried out by comparing the current phone metrics (350) of location (306), motion (308), and usage (310) with a database (320) of predetermined suspect patterns an example of which is described below with reference to FIG. 4. Such a database of suspect patterns may be created by a user by specifying suspect patterns of location, motion, and usage of mobile phones; and storing the specified suspect patterns of location, motion, and usage in a database for comparison with tracked location, motion, and usage of mobile phones.

The current phone metrics (350) of location (350), motion (308), and usage (310) do not have to be exactly the same as the location (350), motion (352), and usage (354) of one or more suspect patters (3120 to be considered a match. The degree to which the current phone metrics (350) of location (350), motion (308), and usage (310) have to be similar to the location (350), motion (352), and usage (354) of one or more suspect patters (3120 to be considered a match will vary according to a number of factors such as accuracy of the measurements of current phone metrics, context such as current threat levels of attack using bombs, specific locations, specific motion patterns specific usage patterns and other as will occur to those of skill in the art.

If the location (306), motion (308), and usage (310) of the mobile phone (102) does not match a suspect pattern (312) of location, motion, and usage the method of FIG. 3 carries on by continuing to track (304), by one or more data communications servers (302) of the data communications network, location (306), motion (308), and usage (310) of a mobile phone (102).

If the location (306), motion (308), and usage (310) of the mobile phone (102) matches a suspect pattern (312) of location, motion, and usage the method of FIG. 3 includes disabling (316), by the one or more data communications servers (302), the mobile phone (102) only from receiving messages. Disabling (316), by the one or more data communications servers (302), the mobile phone (102) only from receiving messages includes disabling the mobile phone from receiving phone calls, disabling the mobile phone from receiving text messages, disabling mobile phone from receiving data from a synchronization function, or disabling the mobile phone from receiving any other messages that will occur to those of skill in the art. Disabling (316) the mobile phone (102) from receiving messages may be carried out by filtering data communications from callers to the mobile phone, including dropping packets of text messages, dropping packets of alerts.

Disabling (316) the mobile phone (102) only from receiving messages maintains the functionality of the mobile phone for all functions other than receiving messages. That is, the ability to send outgoing calls is maintained, the ability to send outgoing text messages is maintained, the ability to maintain local alert functionality on the mobile phone is maintained and so on. Disabling (316) the mobile phone (102) only from receiving messages maintains much of the functionality of the mobile phone but disables the mobile phone from acting as a trigger for a bomb.

Disabling (316) the mobile phone (102) from receiving messages according to the method of FIG. 3 also includes disabling the mobile phone from receiving messages without notifying the mobile phone of the disabling. Failing to notify the mobile phone of the disabling prevents notification to a suspect attacker that the mobile phone is currently suspected of being used as a trigger for a bomb.

To prevent notification of other suspected attackers that the mobile phone is suspected of being used as a trigger for a bomb, disabling (316) the mobile phone (102) from receiving messages according to the method FIG. 3 may also include disabling the mobile phone from receiving messages without notifying callers to the mobile phone of the disabling. In such cases, disabling the mobile phone from receiving messages without notifying callers to the mobile phone of the disabling may be carried out by filtering data communications to the mobile phone including dropping phone calls to the mobile phone and supplying ring tones to callers without connecting calls to the mobile phone, dropping packets of text messages and providing a false confirmation of sending the text message to a text message sender, and in other ways as will occur to those of skill in the art.

After disabling the mobile phone from receiving messages, additional actions may be carried out such as notifying authorities, evacuating the area for a period of time, or other actions as will occur to those of skill in the art. Furthermore, additional actions may be taken on the mobile phone itself such as cycling power on the phone, resetting the phone at a certain time, enabling the mobile to receive messages after a predetermined period of time or at a predetermined time, or other actions as will occur to those of skill in the art.

As mentioned above, determining whether the location, motion, and usage of a mobile phone matches a suspect pattern of location, motion, and usage may be carried out by comparing the current phone metrics of location, motion, and usage of the mobile phone with a database of predetermined suspect patterns. For further explanation, FIG. 4 sets forth a block diagram of an exemplary database (320) of predetermined suspect patterns. The exemplary database (320) of predetermined suspect patterns of FIG. 4 includes six suspect patterns each of which includes a 'PatternID' field (360), a location field (350), a motion field (352), a usage field (354), and a disable field (362) indicating that a match on the location, motion, and usage field should result in disabling the mobile phone from receiving messages.

Figure 4:
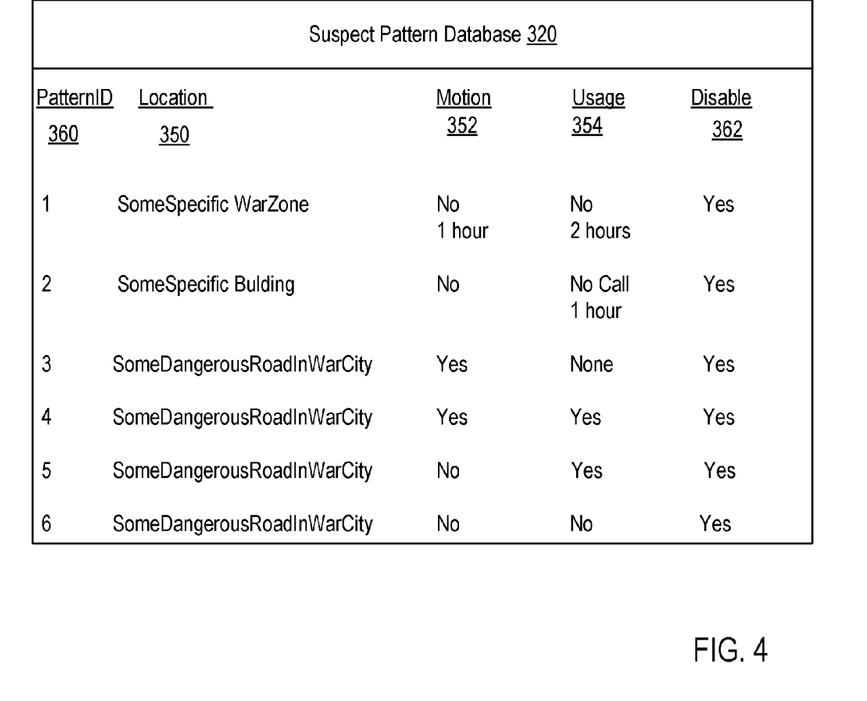
FIG. 4 sets forth a block diagram of an exemplary database of predetermined suspect patterns.

In the example of FIG. 4, the first suspect pattern having pattern ID '1' is a pattern of location, motion, and usage characterized by no motion and no usage for a predetermined period of time of two hours. The suspect pattern having pattern ID '1' is a pattern having a location in a specific war zone called in this example 'SomeSpecficWarZone,' wherein the mobile hone has not moved for one hour and that has had no usage of any kind in two hours.

In the example of FIG. 4, the second suspect pattern having pattern ID '2' is a pattern of location, motion, and usage characterized by no usage for a predetermined period of time of two hours. The suspect pattern having pattern ID '2' is a pattern having a location in a specific building called in this example 'SomeSpecficBuilding,' wherein the mobile hone is currently not moving and that has had not received any calls in two hours.

In the example of FIG. 4, the suspect patterns of location, motion, and usage having pattern IDs 3, 4, 5, and 6 are patterns of location, motion, and usage characterized by a location known to have an associated risk of attack. Each of the suspect patterns 3-6 have a location on a dangerous road in a city at war called 'SomeDangerousRoadInWarCity.' In this example, regardless of a tracked mobile phone's pattern of motion or usage the fact that the tracked location matches 'SomeDangerousRoadInWarCity' the mobile phone is disabled from receiving messages.

The example of FIG. 4 is provided for explanation and not for limitation. Suspect patterns of location, motion, and usage may include additional elements, have ranges of values for location, motion, or usage instead of single values, be time dependent, or vary in other ways from the example of FIG. 4 as will occur to those of skill in the art.

Exemplary embodiments of the present invention are described largely in the context of a fully functional computer system for disabling a mobile phone suspected of being a trigger for a bomb. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for disabling a mobile phone suspected of being a trigger for a bomb, the mobile phone connected for data communications to a mobile phone network, the method comprising:
    tracking, by one or more data communications servers of the mobile phone network, location, motion, and usage of the mobile phone;
    determining, by the one or more data communications servers, whether the location, the motion, and the usage of the mobile phone matches a suspect pattern record, wherein the suspect pattern record includes location criteria, motion criteria, and usage criteria, including:
        determining whether the location of the mobile phone matches the location criteria in the suspect pattern record;
        determining whether the motion of the mobile phone matches the motion criteria in the suspect pattern record; and
        determining whether the usage of the mobile phone matches the usage criteria in the suspect pattern record;
    disabling, by the one or more data communications servers, the mobile phone only from receiving messages if the location, the motion, and the usage of the mobile phone matches a suspect pattern record of location, motion, and usage; and
    enabling, by the one or more data communications servers, the mobile phone to receive messages after expiration of a predetermined period of time.

2. The method of claim 1 further comprising:
    specifying a plurality of suspect pattern records of location, motion, and usage of mobile phones; and storing the specified suspect pattern records of location, motion, and usage in a database for comparison with tracked location, motion, and usage of mobile phones.

3. The method of claim 1 wherein disabling the mobile phone from receiving messages further comprises disabling the mobile phone from receiving messages without notifying the mobile phone of the disabling.

4. The method of claim 1 wherein disabling the mobile phone from receiving messages further comprises disabling the mobile phone from receiving messages without notifying callers to the mobile phone of the disabling.

5. The method of claim 1 wherein disabling the mobile phone from receiving messages further comprises dropping phone calls to the mobile phone and supplying ring tones to callers.

6. The method of claim 1 wherein disabling the mobile phone from receiving messages further comprises dropping packets of text messages and providing a false confirmation of sending the text message to a text message sender.

7. A system for disabling a mobile phone suspected of being a trigger for a bomb, the mobile phone connected for data communications to a mobile phone network, the system comprising a computer processor, a computer memory operatively coupled to the computer processor, the computer memory having disposed within it computer program instructions capable of:
   tracking, by one or more data communications servers of the mobile phone network, location, motion, and usage of the mobile phone;
   determining, by the one or more data communications servers, whether the location, the motion, and the usage of the mobile phone matches a suspect pattern record, wherein the suspect pattern record includes location criteria, motion criteria, and usage criteria, including:
      determining whether the location of the mobile phone matches the location criteria in the suspect pattern record;
      determining whether the motion of the mobile phone matches the motion criteria in the suspect pattern record; and
      determining whether the usage of the mobile phone matches the usage criteria in the suspect pattern record;
   disabling, by the one or more data communications servers, the mobile phone only from receiving messages if the location, the motion, and the usage of the mobile phone matches a suspect pattern record of location, motion, and usage; and
   enabling, by the one or more data communications servers, the mobile phone to receive messages after expiration of a predetermined period of time.

8. The system of claim 7 wherein the computer memory also has disposed within it computer program instructions capable of:
   specifying a plurality of suspect pattern records of location, motion, and usage of mobile phones; and
   storing the specified suspect pattern records of location, motion, and usage in a database for comparison with tracked location, motion, and usage of mobile phones.

9. The system of claim 7 wherein computer program instructions capable of disabling the mobile phone from receiving messages further comprises computer program instructions capable of disabling the mobile phone from receiving messages without notifying the mobile phone of the disabling.

10. The system of claim 7 wherein computer program instructions capable of disabling the mobile phone from receiving messages further comprises computer program instructions capable of disabling the mobile phone from receiving messages without notifying callers to the mobile phone of the disabling.

11. The system of claim 7 wherein computer program instructions capable of disabling the mobile phone from receiving messages further comprises computer program instructions capable of dropping phone calls to the mobile phone and computer program instructions capable of supplying ring tones to callers.

12. The system of claim 7 wherein computer program instructions capable of disabling the mobile phone from receiving messages further comprises computer program instructions capable of dropping packets of text messages and computer program instructions capable of providing a false confirmation of sending the text message to a text message sender.

13. A computer program product for disabling a mobile phone suspected of being a trigger for a bomb, the mobile phone connected for data communications to a mobile phone network, the computer program product disposed in a computer readable recordable storage medium, the computer program product comprising computer program instructions capable of:
   tracking, by one or more data communications servers of the mobile phone network, location, motion, and usage of the mobile phone;
   determining, by the one or more data communications servers, whether the location, the motion, and the usage of the mobile phone matches a suspect pattern record, wherein the suspect pattern record includes location criteria, motion criteria, and usage criteria, including:
      determining whether the location of the mobile phone matches the location criteria in the suspect pattern record;
      determining whether the motion of the mobile phone matches the motion criteria in the suspect pattern record; and
      determining whether the usage of the mobile phone matches the usage criteria in the suspect pattern record;
   disabling, by the one or more data communications servers, the mobile phone only from receiving messages if the location, the motion, and the usage of the mobile phone matches a suspect pattern record of location, motion, and usage; and
   enabling, by the one or more data communications servers, the mobile phone to receive messages after expiration of a predetermined period of time.

14. The computer program product of claim 13 further comprising computer program instructions capable of:
   specifying a plurality of suspect pattern records of location, motion, and usage of mobile phones; and
   storing the specified suspect pattern records of location, motion, and usage in a database for comparison with tracked location, motion, and usage of mobile phones.

15. The computer program product of claim 13 wherein computer program instructions capable of disabling the mobile phone from receiving messages further comprises computer program instructions capable of disabling the mobile phone from receiving messages without notifying the mobile phone of the disabling.

16. The computer program product of claim 13 wherein computer program instructions capable of disabling the mobile phone from receiving messages further comprises computer program instructions capable of disabling the mobile phone from receiving messages without notifying callers to the mobile phone of the disabling.

17. The computer program product of claim 13 wherein computer program instructions capable of disabling the mobile phone from receiving messages further comprises computer program instructions capable of computer program instructions capable of dropping phone calls to the mobile phone and computer program instructions capable of supplying ring tones to callers.

18. The computer program product of claim 13 wherein computer program instructions capable of disabling the mobile phone from receiving messages further comprises computer program instructions capable of dropping packets of text messages and computer program instructions capable of providing a false confirmation of sending the text message to a text message sender.

\* \* \* \* \*